(12) United States Patent
Lo et al.

(10) Patent No.: US 8,280,899 B2
(45) Date of Patent: Oct. 2, 2012

(54) ABSTRACTING EVENTS FOR DATA MINING

(75) Inventors: David Lo, Jurong West (SG); Ganesan Ramalingam, Bangalore (IN); Venkatesh-Prasad Ranganath, Bangalore (IN); Kapil Vaswani, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/578,603

(22) Filed: Oct. 14, 2009

(65) Prior Publication Data

US 2011/0087700 A1 Apr. 14, 2011

(51) Int. Cl.
*G06F 7/00* (2006.01)
(52) U.S. Cl. ............... 707/763; 707/776; 707/999.002
(58) Field of Classification Search .............. 707/763, 707/776, 999.002
See application file for complete search history.

(56) References Cited

U.S. PATENT DOCUMENTS

| | | | |
|---|---|---|---|
| 5,615,341 A | 3/1997 | Agrawal et al. | |
| 6,763,354 B2 | 7/2004 | Hosken | |
| 7,346,601 B2 | 3/2008 | Chaudhuri et al. | |
| 2003/0204834 A1* | 10/2003 | Ball et al. | 717/106 |
| 2005/0166167 A1* | 7/2005 | Ivancic et al. | 716/5 |
| 2006/0282807 A1* | 12/2006 | Ivancic et al. | 716/5 |
| 2009/0055332 A1 | 2/2009 | Lee | |

OTHER PUBLICATIONS

Lo et al. 2009 16th Working Conference on Reverse Engineering, pp. 62-71.*
Lo et al., Mining Quantified Temporal Rules: Formalism, Algorithms, and Evaluation, 2009 16th Working Conference on Reverse Enginering, pp. 62-71.*
Antunes, Claudia., "Onto4AR: A Framework for Mining Association Rules", Jun. 17, 2009, Retrieved at << http://www.ecmlpkdd2007.org/CD/workshops/CMILE/ont/ont.pdf >>, pp. 37-48.
Houtsma, et al., "Set-Oriented Mining for Association Rules in Relational Databases"—, Mar. 6-10, 1995, 1995, IEEE, Retrieved at << http://ieeexplore.ieee.org/stamp/stamp.jsp?tp=& arnumber=380413& isnumber=8637 >>, pp. 25-33.
Lo, et al., "Efficient Mining of Iterative Patterns for Software Specification Discovery", Aug. 12-15, 2007, Proceedings of the 13th ACM SIGKDD international conference on Knowledge discovery and data mining, International Conference on Knowledge Discovery and Data Mining, Retrieved at << http://www.comp.nus.edu.sg/~khoosc/research/kdd07.pdf >>, pp. 1-10.
Gabel, et al., "Symbolic Mining of Temporal Specifications", May 10-18, 2008, Proceedings of the 30th international conference on Software engineering, International Conference on Software Engineering, Retrieved at << http://wwwcsif.cs.ucdavis.edu/~gabel/research/icse08-spec.pdf >>, pp. 1-10.

(Continued)

*Primary Examiner* — Cheyne Ly

(57) ABSTRACT

An event is described herein as being representable by a quantified abstraction of the event. The event includes at least one predicate, and the at least one predicate has at least one constant symbol corresponding thereto. An instance of the constant symbol corresponding to the event is identified, and the instance of the constant symbol is replaced by a free variable to obtain an abstracted predicate. Thus, a quantified abstraction of the event is composed as a pair: the abstracted predicate and a mapping between the free variable and an instance of the constant symbol that corresponds to the predicate. A data mining algorithm is executed over abstracted, quantified events to ascertain a correlation between the event and another event.

20 Claims, 6 Drawing Sheets

OTHER PUBLICATIONS

Siddiqui, et al., "Discovery of Quantified Hierarchical Production Rules from Large Set of Discovered Rules", Aug. 10, 2007, World Academy of Science, Engineering and Technology, Retrieved at << http://www.waset.org/journals/waset/v49/v49-152.pdf >>, pp. 857-863.
"Debugging Tools for Windows", 2009, Microsoft Corporation, Retrieved at << http://www.microsoft.com/whdc/devtools/debugging/default.mspx >>, pp. 1-2.
"Static Driver Verifier", 2009, Microsoft Corporation, Retrieved at << http://www.microsoft.com/whdc/devtools/tools/sdv.mspx >>, pp. 1-2.
"Windows Driver Development", Mon, Aug. 17, 2009, Retrieved at << http://www.osronline.com/ >>, pp. 1-3.
Agrawal, et al., "Fast Algorithms for Mining Association Rules", Proceedings of the 20th VLDB Conference, Retrieved at << http://rakesh.agrawal-family.com/papers/vldb94apriori.pdf >>, pp. 1-13.
Alur, et al., "Synthesis of Interface Specifications for Java Classes", Retrieved at << http://www.cis.upenn.edu/~cernyp/publications/popl05/popl05.pdf , pp. 1-12.
Ammons, et al., "Mining Specification", Retrieved at <<http://www.cs.berkeley.edu/~bodik/research/popl02a.pdf >>, pp. 1-13.
Chen, et al., "Mining Parametric State-Based Specifications from Executions", Retrieved at << http://www.ideals.uiuc.edu/bitstream/handle/2142/11488/Mining%20Parametric%20State-Based%20Specifications%20from%20Executions.pdf?sequence=2 >>, pp. 1-11.
Sousa, et al., "Detecting Implied Scenarios from Execution Traces", Retrieved at <<http://nabor.mendonca.googlepages.com/wcre2007_final.pdf >>, pp. 1-10.
Ernst, et al., "Dynamically Discovering Likely Program Invariants to Support Program Evolution", IEEE Transactions on Software Engineering, vol. 27, No. 2, Feb. 2001, Retrieved at << http://www.cs.washington.edu/homes/mernst/pubs/invariants-tse2001.pdf >>, pp. 99-123.
Gabel, et al., "Javert: Fully Automatic Mining of General Temporal Properties from Dynamic Traces", Retrieved at << http://wwwcsif.cs.ucdavis.edu/~gabel/research/fse08.pdf >>, pp. 1-11.
Lorenzoli, et al., "Automatic Generation of Software Behavioral Models", Retrieved at <<http://www.lta.disco.unimib.it/lta/uploads/papers/LorenzoliEtAl-GKTail-ICSE-2008.pdf >> pp. 1-10.
Ramanathan, et al., "Static Specification Inference Using Predicate Mining", Retrieved at <<http://www.cs.purdue.edu/homes/suresh/papers/pldi07.pdf >>, pp. 1-12.
Safyallah, et al., "Dynamic Analysis of Software Systems Using Execution Pattern Mining", 14th IEEE International Conference on Program Comprehension, 2006, Retrieved at << http://ieeexplore.ieee.org/stamp/stamp.jsp?tp=&isnumber=34208&arnumber=1631109 >>, pp. 1-6.
Yang, et al., "Dynamically Inferring Temporal Properties", Retrieved at << http://www.cs.virginia.edu/~evans/pubs/paste04.pdf , pp. 1-6.
Yang, et al., "Perracotta: Mining Temporal API Rules from Imperfect Traces", 28th International Conference on Software Engineering (ICSE 2006), May 20-28, 2006, Retrieved at << http://www.cs.virginia.edu/~evans/pubs/perracotta-packaged.pdf >>, pp. 10.
Agrawal, et al., "Mining Sequential Patterns", Retrieved at << http://citeseerx.ist.psu.edu/viewdoc/download;jsessionid=55B0F7B6CF81ACF4C4150582704B02A6?doi=10.1.1.40.9892&rep=rep1&type=pdf >>, pp. 1-12.

* cited by examiner

ABSTRACTING EVENTS FOR DATA MINING

BACKGROUND

One of the major themes in data mining is the extraction of patterns existent in a data set. For example, data mining algorithms have been commissioned to recognize correlations in purchase patterns of consumers. For instance, a data mining algorithm can be employed to ascertain that an individual will generally purchase toothpaste if the individual also purchased a toothbrush. In another example, a data mining algorithm can be commissioned to infer sequential patterns in data. If an individual purchases a shirt, for instance, the data mining algorithm can infer that the individual will likely purchase trousers after purchasing the shirt. Such correlations in transactions can be useful in connection with product placement, marketing, etc.

Conventionally, however, data mining techniques have not been widely utilized in connection with software verification tools. For example, given a program and documented rules/constraints imposed by developers on the program, software verification tools can be utilized to verify that the program satisfies the rules/constraints imposed by the developers. For instance, software verification tools can be employed to ascertain that a program that uses a library/application programming interface does so in accordance with rules/constraints of the library/application programming interface. The usefulness of such verification tools, however, is limited due to lack of machine-readable rules/constraints for programs. For instance, with respect to legacy software, developer turnover can result in the loss of a substantial amount of knowledge about the internal workings of the software that is ingrained in the memory of developers but is not written in a specification pertaining to the software. While documentation may curb some of such losses, oftentimes internal details of software are conventionally not documented.

In another example, alteration to undocumented but observed behaviors of software can cause clients of the software to fail as such software evolves. These failures can be alleviated if rules/constraints of the software are available to developers at the time they make modifications to such software.

SUMMARY

The following is a brief summary of subject matter that is described in greater detail herein. This summary is not intended to be limiting as to the scope of the claims.

Described herein are various technologies pertaining to abstracting observed events to generated quantified abstractions of the observed events. In an example, an observed event may be a transaction that includes a plurality of purchases of various items. In another example, an event may pertain to execution of a particular portion of a software program (e.g., a portion of a trace). An observed event may include a plurality of what is referred to herein as predicates. In the case of a transactional event, a predicate may be an attribute/value pair, which can be an indication that an attribute has a certain value, such as a color of a shirt is red, a manufacturer of the shirt is a particular manufacturer, etc. In the case of software, a predicate may be an indication that a return value is a particular number, an indication that an invoked function has a particular name, an indication that a parameter has a specific value, etc.

At least one of the predicates corresponding to the event may have a constant symbol corresponding thereto. In the example pertaining to the shirt, the constant symbol may be a particular color, such as red, green or blue. In the software example, the constant symbol may be a particular value of a parameter. While the examples above have described predicates as being atomic in nature, it is to be understood that the predicates may be conjunctive such that a predicate may be connected by an "and" or an "or".

Once the plurality of predicates have been identified, a subset of such predicates can be selected from the plurality of predicates. Thereafter, a set of instances of constant symbols that correspond to the subset of predicates can be identified. Thus, for instance, if a predicate is indicative of a size of the shirt, the constant symbol may be a particular size (e.g., 40 long). Thereafter, for each instance of the constant symbols identified, a mapping can be generated from a free variable that is chosen to be used in a particular predicate (e.g., to represent the instance of the constant symbol) to the instance of the constant symbol in such predicate. Such mapping can be added to an overall mapping data set that includes all mappings from free variables chosen to be used in predicates to constant symbols corresponding to the subset of predicates.

As indicated above, free variables can be chosen to be used in predicates. For each of the predicates, an abstracted predicate can be constructed by replacing the instance of the constant symbol with a free variable, such that the mapping given the free variable points to the instance of the constant symbol. The predicates corresponding to the event may be rewritten as abstracted predicates by replacing each predicate in the subset of predicates with its corresponding abstracted predicate as described above. The abstracted predicate and the mapping between the subset of abstracted variables and the instances of the constant symbols can be composed as a pair to construct a quantified abstraction of the event. This process can be undertaken for a plurality of events.

Once a plurality of quantified abstracted events are generated, a data mining algorithm can be executed over such quantified abstracted events. To obtain different results, different predicates can be selected to be in the subset of predicates for various events. Executing a data mining algorithm over such abstracted events can allow for inference of rich patterns in a data set (e.g., complex/rich rules/constraints pertaining to a software program).

Other aspects will be appreciated upon reading and understanding the attached figures and description.

DETAILED DESCRIPTION

Figure 1:
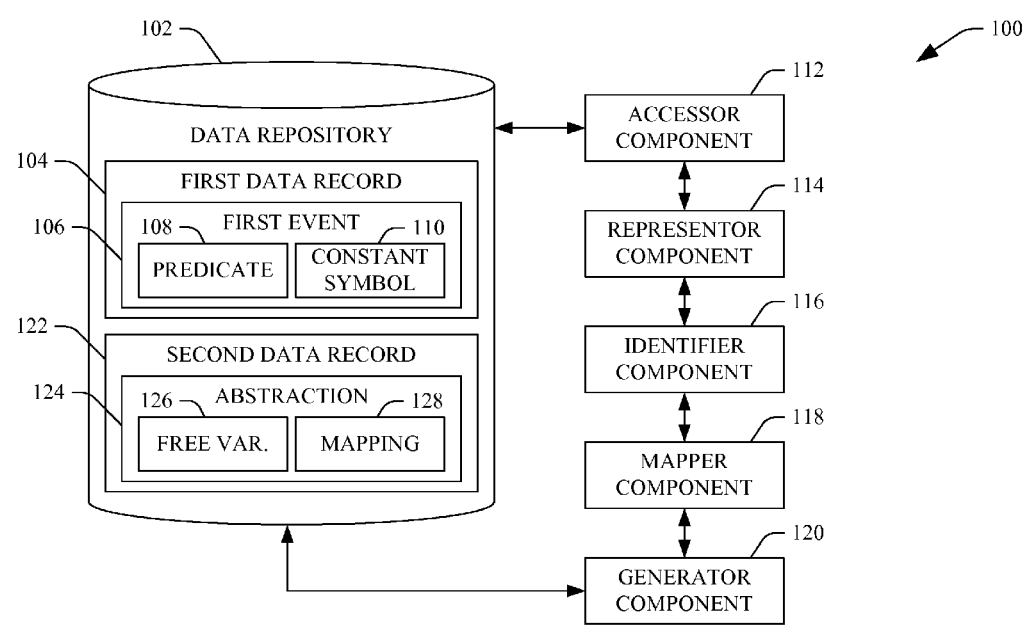
FIG. 1 is a functional block diagram of an example system that facilitates abstracting events in a data set in preparation for performing data mining over such data set.

Various technologies pertaining to abstracting events in a data set will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates abstracting events in a data set is illustrated. As used herein, an event can refer to a tuple of primitive values. Thus, for instance, an event may be transactional in nature, such as an individual purchasing a shirt, wherein the shirt has several attributes corresponding thereto (color, size, manufacturer) and each of such attributes can have a value corresponding thereto. In another example, an event may refer to execution of a particular portion of a software program, wherein such portion of the software program may include an input value, a return value, a function name, a function type, etc. Thus, a primitive value corresponding to an event may be a string, an integer, a floating point value, or other suitable value. Other types of events will be recognized by one of ordinary skill in the art.

The system 100 comprises a data repository 102. The data repository 102 can retain a first data record 104 that is in any suitable format. The first data record 104 can also be referred to herein as a raw data record, and may comprise a single event or multiple events. The first data record 104 can comprise a first event 106. The first event 106 comprises at least one predicate 108, which is a predicate over the event 106. In an example, where the first event 106 is transactional in nature, the predicate 108 can represent a particular attribute/value pair corresponding to the first event 106. In a more detailed example, if the first event 106 is the purchase of a shirt, the predicate 108 may be an attribute/value pair that is indicative of an identity of a manufacturer of the shirt. In another example, the predicate 108 may represent an attribute/value pair that is indicative of a color of the shirt, a size of the shirt, or other suitable attribute/value pairs (e.g., attribute is color or size, and value is red or large, respectively, and the predicates indicate that the color of the shirt is red or the size of the shirt is large).

In another example, as indicated above, the first event 106 can represent execution of a particular portion of a software program. In such a case, for instance, the predicate 108 may be a name of a specific procedure, wherein parameter values corresponding to the procedure may have particular constraints corresponding thereto. Thus, the predicate 108 can match calls to a procedure with a certain parameter value.

The first event 106 can further comprise a constant symbol 110 that corresponds to the predicate 108 (e.g., the predicate 108 may include a constant symbol). The constant symbol 110 is a symbol corresponding to the at least one predicate 108 that is not subject to alteration. Thus, the constant symbol 110 may be a particular value, may be a particular string, letter, etc. Returning to the transaction example, the predicate 108 can represent size of the shirt, and the constant symbol 110 can be the particular size (e.g., 40). In the example where the first event 106 corresponds to execution of the software program, the constant symbol 110 may be a particular return value, a particular parameter value, or other constant symbol.

The system 100 also includes an accessor component 112 that accesses the data repository 102 and retrieves the first data record 104 from the data repository 102. For instance, the data repository 102 may be included in a computer, such as a personal computer, a server computing device, or other suitable computing device. Additionally, as indicated above, the first data record 104 comprises the first event 106, which has the at least one predicate 108 corresponding thereto, and the at least one predicate 108 has the constant symbol 110 corresponding thereto.

A representor component 114 is in communication with the accessor component 112. The representor component 114 utilizes a free variable in the predicate 108 to abstract such predicate 108. Thus, for example, if the predicate 108 is representative of a manufacturer of the shirt, the representor component 114 can utilize a free variable to indicate that the manufacturer of the shirt is the variable "x". In another example, if the predicate 108 represents a return value, the representor component 114 can use a free variable $v_1$ to indicate that the return value is $v_1$.

An identifier component 116 can identify at least one instance of the constant symbol 110 included in the first event 106. For example, in connection with a software program, several instances of a constant symbol may be existent with respect to a particular portion of the software program. The identifier component 116 can identify such instances of the constant symbol 110 that corresponds to the first event 106.

The system 100 further includes a mapper component 118 that generates a mapping between the at least one free variable used in the predicate 108 and the at least one instance of the constant symbol 110 identified by the identifier component 116. Considering instances of constant symbols (instead of constant symbols) allows different instances of the constant symbol 110 to be mapped to different free variables in a same abstraction. Example mappings between free variables and instances of constant symbols 110 are provided below.

A generator component 120 can be in communication with the mapper component 118. The generator component 120 can be configured to generate a second data record 122 and cause such second data record 122 to be stored in the data repository 102. Contents of the second data record 122 include an abstraction 124 of the first event 106, wherein the abstraction 124 is a quantified abstraction of the first event 106. The abstraction 104 generated by the generator component 120 includes a free variable 126 used in the predicate 108 and a mapping 128 between the free variable 126 and the instance of the constant symbol 110 identified by the identifier component 116.

The description of the system 100 above describes construction of a single abstraction 124 of the first event 106. It is to be understood that multiple abstractions of the first event 106 can be generated if there are multiple predicates that correspond to the first event 106 and/or if predicates comprise multiple instances of constant symbols. For instance, if the first event 106 has a plurality of predicates corresponding thereto, the abstraction 124 may include the free variable 126 that corresponds to one of such predicates and the mapping 128 that maps the free variable 126 to the instance of the constant symbol corresponding to the predicate 108. The remainder of the abstraction 124 may be another free variable that is used in a different predicate and instances of constant symbols that correspond to the different predicate. Thus, any suitable combination of predicates can be assigned free variables, and mappings can be generated between the free variables and instances of constant symbols corresponding thereto. Therefore, a single event may have multiple abstractions related thereto.

Figure 2:
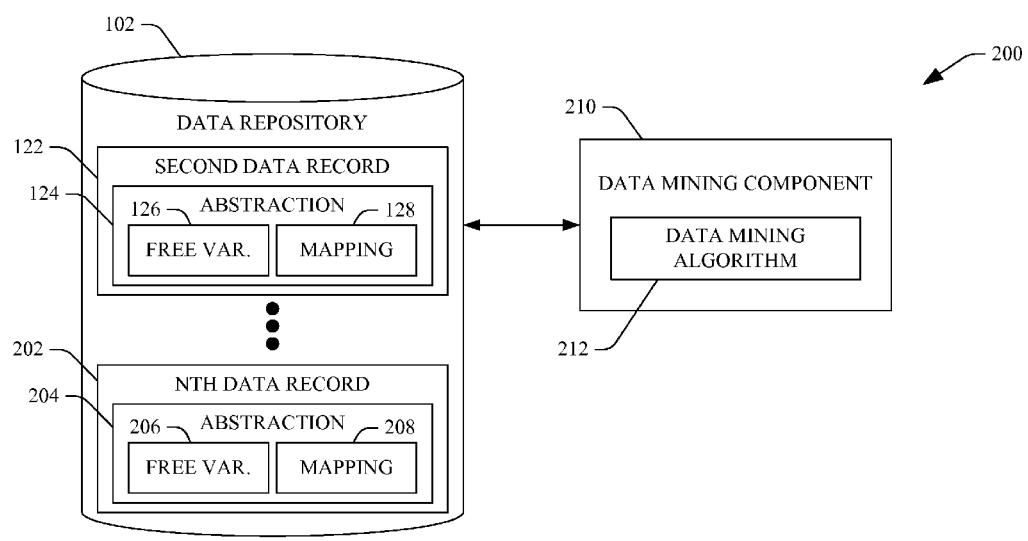
FIG. 2 is a functional block diagram of an example system that facilitates executing a data mining algorithm over abstracted events.

Referring now to FIG. 2, an example system 200 that facilitates executing a data mining algorithm over quantified abstractions of events is illustrated. The system 200 comprises the data repository 102 that includes the second data record 122, which comprises a representation of the first event 106 in the first data record 104 (FIG. 1). That is, the second data record 122 comprises the abstraction 124 of the first event 106, wherein the abstraction 124 includes the at least one free variable 126 that included in the predicate 108, and the mapping 128 between the free variable 126 and at least one instance of the constant symbol 110. The data repository 102 also includes an nth data record 202, which is a representation of another event included in the data repository 102. The nth data record 202 includes an abstraction 204 that is a quantified abstraction of at least one other event represented in the data repository 102. The abstraction 204 includes a free variable 206 that is included in a predicate that corresponds to the at least one other event and a mapping 208 between the free variable 206 and an instance of a constant symbol that corresponds to such free variable 206.

The system 200 further includes a data mining component 210 that is configured to execute a data mining algorithm 212 over the second data record 102 and the nth data record 202. The data mining algorithm 212 can be configured to output an indication of correlation between the second data record 122 and the nth data record 202. In an example, the indication of correlation can include an indication of a temporal correlation between the first event, represented by the abstraction 124, and the nth event represented by the abstraction 204. An example of a temporal correlation may be that if a person first buys a shirt, that person will thereafter buy pants. In another example, a temporal correlation may be that if a particular functional call has a certain input, such function call will later be followed by another function with a particular output. In yet another example, the indication of correlation output by the data mining algorithm 212 may be an indication of a transactional correlation between the first event, represented by the abstraction 124, and another event, represented by the abstraction 204. An example transactional correlation is that if a person buys a toothbrush, that person is also highly likely to purchase toothpaste. In a software program, a transactional correlation may be that if a function call exists with a certain parameter, then a return value for another function may be a particular value.

Figure 3:
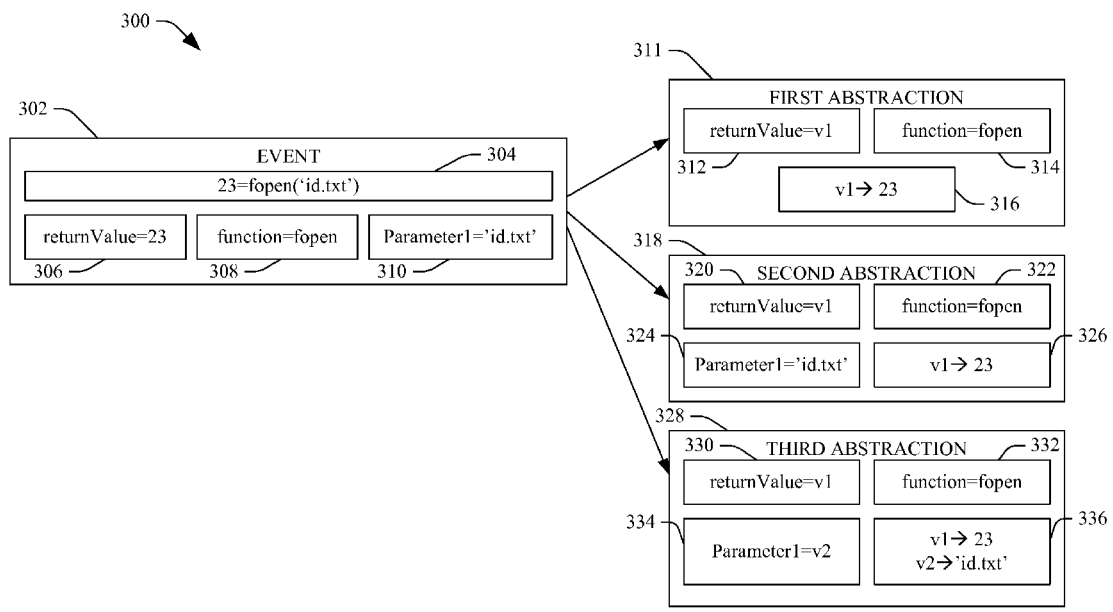
FIG. 3 is diagram of example quantified abstractions of an event.

With reference now to FIG. 3, an example depiction 300 of various ways to perform an abstraction over an event is illustrated. The depiction 300 comprises an event 302. The event 302 may include the execution of the function fopen, with an input argument id.txt that returns the numerical value 23 as a file handle. This event is illustrated in the functional block 304. The event 302 can be represented through utilization of three predicates 306, 308 and 310. The first predicate corresponds to the return value equaling 23 (returnValue=23). The second predicate corresponds to the function equaling fopen (function=fopen). The third predicate 310 corresponds to the first parameter of the event 302 being id.txt (Parameter1=id.txt). Therefore, the event 302 can be represented as predicates return value=23 and function=fopen; and return value=23 and function=fopen and parameter 1=id.txt, wherein the representation comprises constant symbols/values, where x=y is a positional predicate that denotes that y occurs at position x.

From such representations of the event 302, the system 100 can be utilized to construct at least three different quantified abstractions. For example, with respect to a first abstraction 311, a free variable v1 can be included in the predicate 306, as shown in function block 312. The function block 312 is thus an abstracted version of the predicate 306. The second predicate 308 can remain unchanged in the first abstraction 311, as shown in function block 314. An instance of the constant symbol 23 can be identified and can be mapped to the free variable v1, as shown in function block 316. It can be ascertained that in the first abstraction 311 the predicate 310 is not included therein.

In a second abstraction 318, a free variable v1 can be employed in connection with abstracting the first predicate 306 as shown in function block 320. The second predicate 308 and the third predicate 310 can remain unaltered, as shown in function blocks 322 and 324. As shown in function block 326, the instance of the constant symbol can be mapped to the free variable v1.

In a third abstraction 328, the free variable v1 can again be chosen to be used to abstract the first predicate 306, as shown in function block 330. The second predicate 308 may remain unchanged, as shown in function block 332. A free variable v2 can be used to abstract the third predicate 310, as shown in function block 334. In function block 336 it can be ascertained that the free variable v1 is mapped to the value 23 while the free variable v2 is mapped to the parameter value id.txt. As will be shown by way of example below, the free variables and mappings may be utilized by a data mining algorithm to ascertain correlations between events.

As indicated above, such abstractions can be employed in connection with a data mining algorithm that can be configured to mine rules/specifications of a software program. The implications of abstracting events in a manner such as that described above is that data mining algorithms can leverage known properties to incrementally consider richer abstractions of events to efficiently mine richer specifications/rules pertaining to the software program. This can be undertaken by avoiding abstractions of events that are known to not contribute to a rule. Additionally, any data mining algorithm that operates on a sequence of events can operate on a sequence of events of abstractions resulting from executing of the system 100. Furthermore, the abstractions can be generated independent of the class of predicates, so long as terms involved in the predicates are comparable.

Moreover, the data mining algorithm can be utilized to mine temporal rules through utilization of trace abstractions. For instance, given a trace that encodes an execution path as a sequence of events, the trace can be viewed as a sequence of predicates satisfied by the events in the corresponding position in the original trace. Accordingly, specification mining algorithms can deal with one trace composed of a large number of sets of (repeated) predicates, as opposed to considering prohibitively numerous views of the same trace.

The data mining algorithm indicated above can be configured to execute over abstractions and ascertain temporal rules corresponding to the abstractions of the events. For instance, the temporal rule $\xi_1 \rightarrow \xi_2$ represents the rule that any occurrence of $\xi_1$ must be eventually followed by an occurrence of $\xi_2$. Thus, a sequence $\pi = e_1, e_2, \ldots e_n$ satisfies the temporal formula $\xi_1 \rightarrow \xi_2$ (denoted $\pi \models \xi_1 \rightarrow \xi_2$) if and only if for any $e_i \models \xi_1$ there exists a $j > i$ such that $e_j \models \xi_2$.

In another example, the temporal rule $\xi_1 \Rightarrow \xi_2$ represents a rule that (i) any occurrence of $\xi_1$ must eventually be followed by an occurrence of $\xi_2$, and (ii) an occurrence of $\xi_1$ cannot be followed by another occurrence of $\xi_1$ before an occurrence of $\xi_2$. In such rules, $\xi_1$ can be referred to as antecedent, and $\xi_2$ can be referred to as a consequent of the rule.

When constraints are introduced, wherein the constraints involve parameter and return values of different events in a temporal rule, such rules can become quantified. An example may be "every call made to foo(x) can be preceded by a call to bar that returned x". As can be ascertained, this form of rule can be learned by executing the data mining algorithm over abstractions generated by way of the system 100. More formally, quantification is enabled through generalizing event predicates to allow event predicates that include free variables.

An example algorithm for performing data mining over abstracted events pertaining to a software program (e.g., a call to an API or library) is described in *Mining Quantified Temporal Rules: Formalism, Algorithm and Evaluation*, by David Lo, et al., 16$^{th}$ Working Conference on Reverse Engineering (WCRE09), Lille, France, Oct. 13-16, 2009, the entirety of which is incorporated herein by reference.

Figure 4:
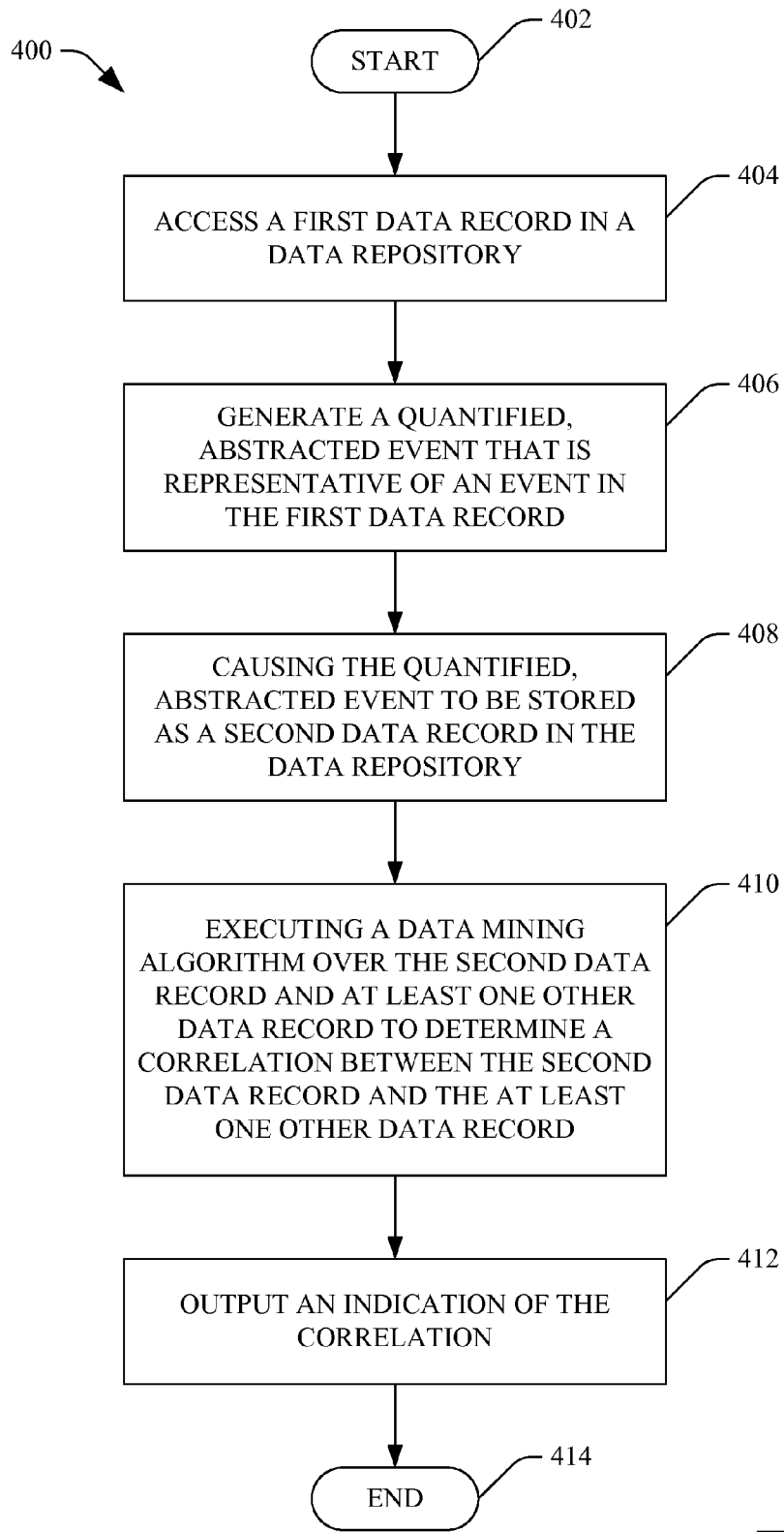
FIG. 4 is a flow diagram that illustrates an example methodology for abstracting events in a data set and executing a data mining algorithm over such abstracted events.
Figure 5:
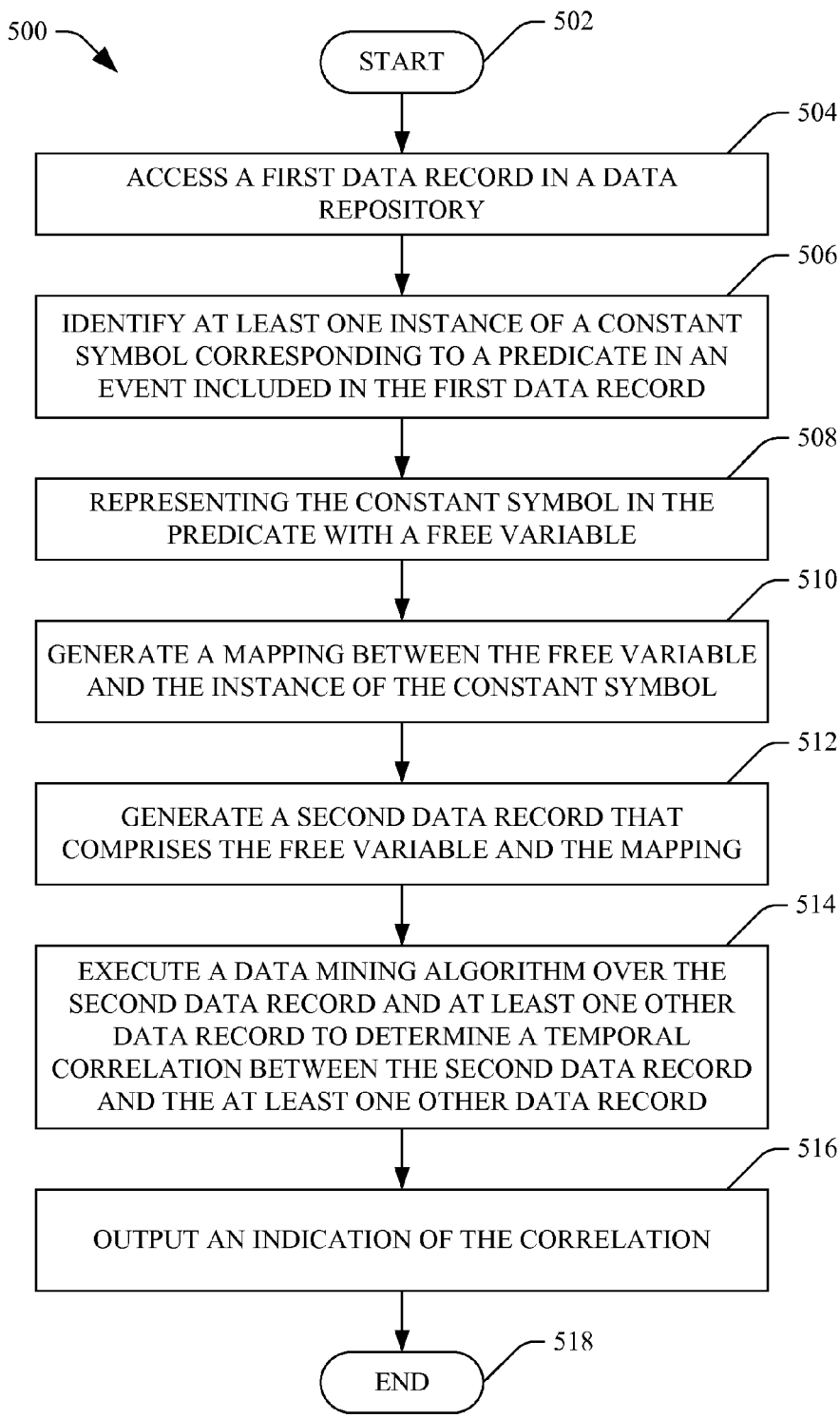
FIG. 5 is a flow diagram that illustrates an example methodology for executing a data mining algorithm over abstracted events.

With reference now to FIGS. 4 and 5, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 4, a methodology 400 that facilitates abstracting an event is illustrated. The methodology 400 begins at 402, and at 404 a first data record is accessed in a data repository. The first data record comprises a first event, wherein the first event comprises at least one predicate and at least one value that corresponds to the at least one predicate.

At 406, a quantified, abstracted event is generated that is representative of the first event. Generating the quantified, abstracted event can include using at least one free variable to abstract the at least one predicate. Generating the quantified abstracting event can further include generating a mapping between the at least one free variable and at least one instance of a constant symbol that corresponds to the at least one predicate. The free variable(s) and the mapping(s) can be stored in the data repository as a second data record.

At 408, the quantified abstracted event is caused to be stored as a second data record in the data repository. At 410, a data mining algorithm is executed via at least one computer processor over the second data record and at least one other data record to determine a correlation between the second data record and the at least one other data record. Such correlation may be in the form of a rule pertaining to accessing an application programming interface. In another example, such correlation may be temporal in nature and/or transaction in nature.

At 412, an indication of the correlation is output. For instance, the indication of the correlation can be output to a display screen, to a memory device, a hard drive, etc.

It is to be understood that the first event can include a plurality of predicates, wherein at least a subset of such predicates has constant symbols corresponding thereto. In such a case, generating the quantified abstracted event can include selecting a subset of the plurality of predicates that correspond to the first event, using a corresponding set of free variables to abstract each of the subset of the plurality of predicates, and generating mappings between the set of free variables and instances of the constant symbols that correspond to the subset of predicates. Different quantified abstractions of the first event can be generated by selecting different subsets of predicates and mapping free variables that represent such predicates to constant symbols corresponding thereto.

The first event described above can pertain to, for instance, an application programming interface, a library, an execution path of a program executed by a computer processor, etc. Moreover, as described above, the quantified abstraction in the second data record can be composed as a pair, wherein the pair comprises free variables that represent predicates corresponding to the first event, and a mapping between the free variables and instances of constant symbols corresponding to the predicates. Further, the first event can be generated by encoding an execution path of an application (software program) executed by the computer processor. The methodology 400 completes at 414.

With reference to FIG. 5, an example methodology 500 that facilitates executing a data mining algorithm over a quantified abstraction of an event is illustrated. The methodology 500 begins at 502, and at 504 a first data record is accessed in a data repository. The first data record can include a first event that occurred during execution of a software program, wherein the first event has at least one predicate corresponding thereto, and the at least one predicate has a constant symbol corresponding thereto. Examples of predicates and constant symbols have been provided above.

At 506, at least one instance of the constant symbol corresponding to the predicate in the first event is identified in the first data record.

At 508, at least one free variable is used to abstract the predicate. At 510, for the at least one identified instance of the constant symbol, a mapping is generated between the free variable and the at least one instance of the constant symbol.

At 512, a second data record is generated in the data repository, wherein the second data record comprises at least one free variable and the mapping composed as a pair. As described above, this composed pair can represent a quantified abstraction of the first event.

At 514, a data mining algorithm is executed over the second data record and at least one other data record to determine a temporal correlation between the second data record and the at least one other data record (e.g., and thus the first event and another event). At 516, an indication of the correlation is output, and the methodology 500 completes at 518.

Figure 6:
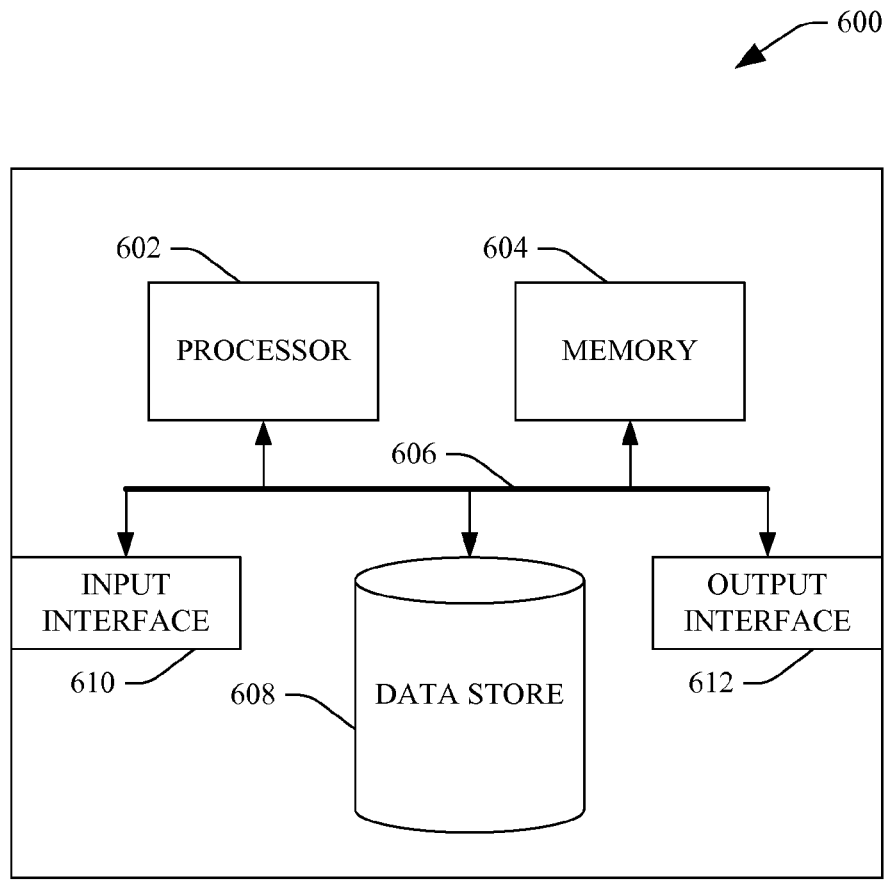
FIG. 6 is an example computing system.

Now referring to FIG. 6, a high-level illustration of an example computing device 600 that can be used in accordance with the systems and methodologies disclosed herein is illustrated. For instance, the computing device 600 may be used in a system that supports abstracting events in a quantified manner. In another example, at least a portion of the computing device 600 may be used in a system that supports executing data mining algorithms over quantified abstracted events. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store events, quantified abstractions of the events, etc.

The computing device 600 additionally includes a data store 608 that is accessible by the processor 602 by way of the system bus 606. The data store 608 may include executable instructions, events, quantified abstractions of the events, etc. The computing device 600 also includes an input interface 610 that allows external devices to communicate with the computing device 600. For instance, the input interface 610 may be used to receive instructions from an external computer device, from an individual, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method configured for execution by at least one computer processor over a dataset in a data repository, the method comprising:
   accessing a raw data record in the data repository, wherein the raw data record comprises a first event, wherein the first event comprises at least one predicate and at least one constant symbol that corresponds to the at least one predicate;
   generating a quantified, abstracted event that is representative of the first event, wherein generating the quantified, abstracted event comprises:
      using at least one free variable to abstract the predicate; and
      generating a mapping between the at least one free variable and at least one instance of the at least one constant symbol to quantify the at least one predicate;
   causing the quantified, abstracted event to be stored as a second data record in the data repository;
   executing, via the at least one computer processor, a data mining algorithm over the second data record and at least one other data record to determine a correlation between the second data record and the at least one other data record, wherein executing the data mining algorithm comprises comparing the mapping between the at least one free variable and at least one instance of the at least one constant symbol and a second mapping that corresponds to the at least one other data record; and
   outputting an indication of the correlation between the second data record and the at least one other data record based at least in part upon the comparing between mappings.

2. The method of claim 1, wherein the correlation between the second data record and the at least one other data record is a transactional correlation.

3. The method of claim 1, wherein the correlation between the second data record and the at least one other data record is a temporal correlation.

4. The method of claim 1, wherein the first event comprises a plurality of predicates, and wherein generating the quantified, abstracted event further comprises:
   selecting a subset of the plurality of predicates;
   representing instances of constant symbols corresponding to the subset of the plurality of predicates with a set of free variables; and
   generating mappings between the set of free variables and the instances of constant symbols that correspond to the subset of predicates.

5. The method of claim 1, wherein the raw data record comprises an event pertaining to an application programming interface.

6. The method of claim 1, wherein the first event corresponds to an execution path of a program executed by the computer processor.

7. The method of claim 1, wherein the second data record is composed as a pair, wherein the pair comprises free variables that represent attributes corresponding to the first event and a mapping between the free variables and instances of constant symbols corresponding to the at least one predicate.

8. The method of claim 1, further comprising generating the first event by encoding an execution path of an application executed by the computer processor.

9. The method of claim 1, wherein the data mining algorithm is configured to mine a specification of a software application.

10. The method of claim 1, wherein the data mining algorithm outputs a rule, wherein the rule comprises an antecedent and a consequent, and wherein a free variable is included in the antecedent and the consequent of the rule.

11. The method of claim 1, wherein the first event is a tuple of primitive values, wherein a primitive value is a string or an integer.

12. The method of claim 1, wherein the first event represents a call to an application programming interface method by a client computing device.

13. A system, comprising:
   a processor; and
   a memory that comprises a plurality of components that are executed by the processor, the plurality of components comprising:
      an accessor component that accesses a data repository in a computer and retrieves a raw data record from the data repository, wherein the raw data record comprises a first event that has at least one predicate corresponding thereto, wherein the at least one predicate has a constant symbol corresponding thereto;
      a representor component that represents the at least one constant symbol in the at least one predicate with at least one free variable;
      an identifier component that identifies at least one instance of the at least one constant symbol that corresponds to the at least one predicate;
      a mapper component that generates a mapping between the at least one free variable and the at least one instance of the at least one constant symbol; and
      a generator component that generates a second data record, wherein the second data record comprises an abstracted, quantified representation of the first event and causes the abstracted, quantified representation of the first event to be stored as the second data record in a data repository, wherein the second data record comprises the at least one free variable and the mapping.

14. The system of claim 13, wherein the at least one event pertains to a function call in a software program.

15. The system of claim 13, wherein the first event represents a call to an application programming interface method by a client computing device.

16. The system of claim 13, wherein the plurality of components further comprises a data mining component that executes a data mining algorithm over the second data record and at least one other data record, wherein the data mining component outputs an indication of correlation between the second data record and the at least one other data record.

17. The system of claim 16, wherein the indication of correlation comprises an indication of temporal correlation between the first event and a second event represented by the at least one other data record.

18. The system of claim 16, wherein the indication of correlation comprises an indication of transactional correlation between the first event and a second event represented by the at least one other data record.

19. The system of claim 16, wherein the at least one predicate is an attribute/value pair of the first event.

20. A computer readable data storage device comprising instructions that, when executed by a processor, cause the processor to perform acts comprising:

accessing a first data record in a data repository, wherein the first data record comprises a first event that occurred during execution of a software program, wherein the first event has at least one predicate corresponding thereto, and wherein the at least one predicate has a constant symbol corresponding thereto;

identifying at least one instance of the constant symbol;

representing the at least one constant symbol in the at least one predicate with at least one free variable;

for the at least one identified instance of the constant symbol, generating a mapping between the free variable and the at least one instance of the constant symbol;

generating a second data record in the data repository, wherein the second data record comprises the at least one free variable and the mapping;

executing a data mining algorithm over the second data record and at least one other data record to determine a temporal correlation between the second data record and the at least one other data record; and outputting the temporal correlation.

* * * * *